March 28, 1961 W. SCHOLL 2,976,958
SHOE BRAKE CONSTRUCTION
Filed Feb. 12, 1958
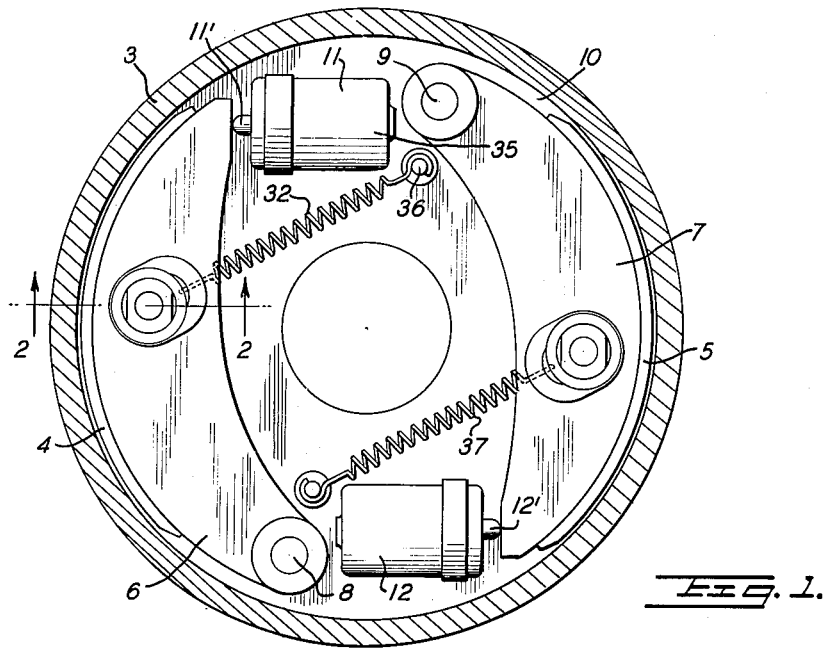
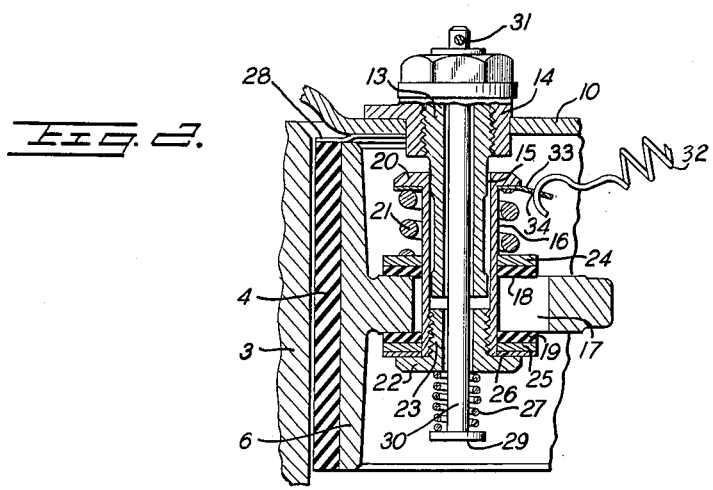
INVENTOR
WALTHER SCHOLL
BY *Dicke and Craig*
ATTORNEYS.

United States Patent Office 2,976,958
Patented Mar. 28, 1961

2,976,958

SHOE BRAKE CONSTRUCTION

Walther Scholl, Sindelfingen Kreis, Boblingen, Germany, assignor to Daimler-Benz Aktiengesellschaft, Stuttgart-Unterturkheim, Germany Filed Feb. 12, 1958, Ser. No. 714,876

Claims priority, application Germany Feb. 14, 1957

11 Claims. (Cl. 188—79.5)

The present invention relates to a shoe brake construction, especially for motor vehicles, provided with an adjusting device in which the adjusting sleeve which extends through an aperture in the shoe, namely through the so-called adjusting slot, is arranged on a pin rigidly connected with the brake anchoring plate with play in the direction of movement of the respective brake shoe, namely with the so-called vent play, and carries a plurality of friction disks which are forced against the brake shoe.

In brake shoes of the prior art, a return spring usually acts on the respective brake shoe which draws the respective brake shoe back by the amount of the vent play. However, with adjusting devices of this type, it may occur, if the friction force of the friction disks decreases, for example, as a result of oil seepage into the brake which reaches the friction disks, that the return spring draws back the respective brake shoe not only by the amount of the vent play but by the further amount as permitted by the adjusting slot. In that case, the danger exists that the brake lever movement or path during the next actuation of the brake does not suffice to produce abutment of the brake shoes against the brake drums and therewith no braking effect is obtained at the particular brake shoe or shoes.

For purposes of avoiding these disadvantages of the prior art, the present invention proposes to connect the return spring so as to act on the adjusting sleeve. In that case, the return spring is capable of drawing back the respective brake shoe only by the amount of the vent play so that even if there is a decrease in the friction force at the friction disks the normal brake movement or path of the brake pedal or lever suffices for safe actuation of the brake.

The return spring is advantageously displaced with respect to the center of the brake shoe in such a manner that a moment is exerted on the brake shoe by the force actuating the brake shoe in conjunction with the force of the return spring which increases the effect of a spring normally urging the brake shoe in the usual manner perpendicularly with respect to the brake anchoring plate against an abutment member such as an abutment sheet-metal member.

According to another feature in accordance with the present invention, the return spring which draws back the brake shoe is connected or anchored with one end thereof in a sheet-metal disk placed upon the adjusting sleeve and with the other end thereof, preferably in proximity to the base portion of the brake cylinder coordinated or cooperating with this particular brake shoe, in a bolt member rigidly connected with the brake anchoring plate.

Accordingly, it is an object of the present invention to provide a brake shoe construction which avoids the disadvantages of the prior art and which provides a more reliable and safe shoe brake construction.

Another object of the present invention resides in the provision of a brake shoe construction in which the return spring is so arranged as to minimize the danger of excessive return movements of the brake shoes.

Still another object of the present invention resides in the provision of a brake shoe construction in which proper actuation thereof is assured with every actuation of the brake pedal or lever.

A still further object of the present invention resides in the provision of a brake shoe construction in which the actuation thereof is not endangered by the possible presence of any oil.

These and other objects, features and advantages of the present invention will become more obvious from the following description when taken in connection with the accompanying drawing which shows, for the purposes of illustration only, one embodiment in accordance with the present invention and wherein:

Figure 1 is an elevational view of a brake shoe construction of usual structure provided with return springs in accordance with the present invention, the outer wall of the brake drum being removed for purposes of clarity; and Figure 2 is a cross-sectional view along line 2—2 of Figure 1.

Referring now to the drawing, wherein like reference numerals are used throughout the two views to designate like parts, the shoe brake illustrated therein includes in the usual manner two friction or brake linings 4 and 5 mounted on two brake shoes 6 and 7, respectively, which are accommodated within a brake drum 3, the inner surface of the brake drum 3 cooperating with the friction linings 4 and 5 for purposes of obtaining the braking effect, as is conventional. One end each of the brake shoes 6 and 7 is pivotally mounted about a fixed pin 8 and 9, respectively, whereas the actuating cylinders 11 and 12 exert with the piston rods 11' and 12' thereof actuating forces against the other end of each brake shoe 6 and 7. The actuating cylinders 11 and 12 are rigidly mounted at the anchoring plate 10 of the brake.

As shown in detail in Figure 2, in connection with the brake shoe 6, though the brake shoe 7 is of corresponding construction, the adjusting arrangement includes a hollow bolt member 13 which is threaded into a bushing or sleeve 14 secured to the brake anchoring plate 10 in any suitable manner. An adjusting sleeve 16 is arranged on the hollow bolt member 13 with play indicated in Figure 2 by reference numeral 15, usually called the "vent play," the adjusting sleeve 16 extending through the adjusting slot 17 provided in the brake shoe 6. A friction disk 18 and 19 is provided on each side of the brake shoe 6 which surround the adjusting sleeve 16. The friction disk is forced against the brake shoe 6 directly by the action of a spring 21 which abuts against a washer 33 resting against collar 20 provided on the adjusting sleeve 16, on the one hand, and against a washer 24 resting against friction disk 18, on the other. The friction disk 19 is also urged against the brake shoe 6 indirectly by the spring action 21 by reason of the collar portion 22 provided on bushing 23 which is threaded into the adjusting sleeve 16. Reference numerals 24, 25 and 26 thereby designate sheet-metal washers or disks inserted between the spring 21 and friction disk 18, and between the friction disk 19 and the collar portion 22, respectively.

A compression spring 27 serves the purpose of axially fixing or securing the brake shoe 6, the compression spring 27 acting against the bushing 23 and pressing the brake shoe 6 over the friction disk 19 against an abutment member 28, such as a sheet-metal abutment member 28 which is rigidly secured at the anchoring plate 10 in any suitable manner. The spring 27 abuts at the lower end thereof, as seen in Figure 2, against the head portion 29 of a pin 30 extending through the hollow bolt member 13 which pin 30 is thereby forced by means of a cross pin 31 against the anchoring plate 10 on the side thereof opposite that on which the brake shoe 6 is located.

The return spring 32 of the brake shoe 6 is arranged offset or displaced with respect to the brake shoe center, i.e., the plane in which the center of the brake shoe is disposed which divides the flange portion thereof into two halves, in the direction toward the brake anchoring plate 10, as seen in Figure 2, essentially in the direction of movement of the brake shoe 6. The return spring 32 is thereby connected at one end thereof into an aperture 34 provided in a sheet-metal disk 33 which is placed over the adjusting sleeve 16 and is forced by the spring 21 against the collar portion 20 of the adjusting sleeve 16. The other end of the return spring 32 is secured to a bolt member 36 which is fastened to the anchoring plate 10 near the base portion 35 of the actuating cylinder 11 pertaining or coordinated to the brake shoe 6.

The corresponding return spring 37 of the brake shoe 7 is constructed and arranged in a similar manner.

*Operation*

The operation of the brake shoe construction in accordance with the present invention is as follows:

Upon actuation of the brake, the brake shoes 6 and 7 are forced into abutment with the brake linings 4 and 5 thereof against the brake drum 3 as a result of the force exerted by the piston rods 11' and 12' of the actuating cylinders 11 and 12. At the same time, the adjusting sleeve 16 belonging to the brake shoe 6, and it is understood, of course, that the same is true for the corresponding adjusting sleeve belonging to brake shoe 7, is taken along by the friction disks 18 and 19 by an amount corresponding to the vent play 15, i.e., the play between the adjusting sleeve 16 and the hollow bolt member 13, so that the adjusting sleeve 16 abuts on the other side thereof opposite that shown in the drawing.

The force exerted by the piston 11' acting upon brake shoe 6 in a horizontal direction stresses spring 32. This spring, as shown in Figure 1, is inclined to the horizontal, being offset with regard to the brake shoe center as described above. The conjunctive effect of the horizontally applied force of the piston and that of the offset inclined spring is such as to cause the exertion of a moment effective, in conjunction with the force exerted by spring 27, to move the brake shoe 6 relative to the hollow bolt member 13 and against abutment member 28 carried by the plate 10. Thus the brake shoe is prevented from vibrating and hence a source of squeaking noises is eliminated.

Whereas generally the brake shoe 6, after overcoming the vent play 15, is forced under sufficiently large pressure against the brake drum 3 and therewith the movement thereof is terminated, upon the occurrence of wear of the friction surface 4, the brake shoe 6 is moved further against the brake drum 3 under the effect of the actuating force exerted thereon by the piston rod 11'. The brake shoe 6 thereby carries out a relative movement with respect to the adjusting sleeve 16 by an amount equal to the wear while at the same time overcoming the friction forces of the friction disks 18 and 19 forced thereagainst. Since even in that case the brake shoe upon cessation of the actuating force is returned by the spring 32 only by the amount of the vent play 15, and more particularly since the return spring pulls back the adjusting sleeve 16 with respect to the hollow bolt member 13 and therewith the brake shoe 6 over the friction disks 18 and 19, an automatic adjustment and adaptation of the initial position of the brake shoe to the particular wear and tear conditions of the friction lining 4 is thereby assured at all times. It is impossible that the brake shoe 6 as well as the brake shoe 7 be pulled back by the return springs 32 and 37 thereof beyond the vent play in a construction in accordance with the present invention.

While I have shown and described one preferred embodiment in accordance with the present invention, it is understood that the same is not limited thereto but is susceptible of many changes and modifications within the spirit and scope of the present invention, and I therefore intend to cover all such changes and modifications as encompassed by the appended claims.

I claim:

1. A shoe brake construction provided with a brake shoe having an adjusting slot and including an automatic adjusting mechanism, comprising a relatively stationary brake member, a bolt member secured to said relatively stationary member, an adjusting sleeve mounted on said bolt member with play, said bolt member and said sleeve extending through said slot, friction disk means arranged on said adjusting sleeve, means urging said friction disk means against said brake shoe, and return spring means connected at one end thereof to said relatively stationary member and at the other end thereof to said adjusting sleeve.

2. A shoe brake construction according to claim 1, further comprising actuating means for actuating said brake shoe, abutment means secured to said stationary brake member, and said return spring means being displaced with respect to the center of said brake shoe in such a manner as to produce a moment together with the force exerted by said actuating means effective to move said brake shoe axially of said bolt member and against said abutment means.

3. A shoe brake construction according to claim 2, further comprising washer means mounted on said adjusting sleeve, said return spring means being connected at said one end thereof to said washer.

4. A shoe brake construction according to claim 3, wherein said actuating means includes an actuating cylinder and wherein said one end of said spring means is secured to said relatively stationary member in proximity to said actuating cylinder.

5. A shoe brake construction provided with brake shoe means and a relatively stationary brake member, comprising automatic adjusting means including two parts movable relative to each other by a predetermined amount of play, means securing one of said two parts to said relatively stationary brake member, friction disk means supported on the other of said two parts, means urging said friction disk means against said brake shoe, and return spring means connected at one end thereof to said relatively stationary brake member and at the other end thereof to the said other of said two parts.

6. A shoe brake construction according to claim 5, further comprising actuating means for energizing said brake shoe, and wherein said return spring means is connected at said other part in such a manner as to produce a moment together with the force exerted by said actuating means urging said brake shoe against said relatively stationary brake member to avoid any squeaking noises during operation thereof.

7. A shoe brake construction, especially for motor vehicles, comprising brake shoe means provided with an adjusting slot, a relatively stationary brake member, and adjusting means for said brake shoe means including a bolt member, a sleeve member mounted on said bolt member with play, both said bolt member and said sleeve member extending through said slot, a friction disk in abutting engagement with said brake shoe on each side thereof and mounted on said sleeve member, spring means for urging one of said friction disks directly into said abutting engagement with said brake shoe means and for urging the other friction disk indirectly into said abutting engagement with said brake shoe means, and return spring means operatively connected with said sleeve member at one end thereof and at said relatively stationary brake member at the other end thereof for urging said brake shoe into the disengaged position thereof.

8. A shoe brake construction according to claim 7, wherein said sleeve member includes a collar portion at one end thereof, and bushing means including a collar portion at the other end thereof, one of said collar portions abutting against said spring means and the other collar portion against said one of said friction disks.

9. A shoe brake construction according to claim 8 further comprising washer means between said one friction disk and said spring means and between said other friction disk and said other collar portion, and metal washer means intermediate said spring means and said one collar portion provided with an aperture for insertion therein of said one end of said spring means.

10. A shoe brake construction according to claim 9, further comprising bolt means extending through said bolt member and including a head portion, and spring means intermediate said head portion and said other of said collar portions for urging said brake shoe means against said relatively stationary part.

11. A shoe brake construction provided with brake shoe means and a relatively stationary brake member, comprising automatic adjusting means including two parts movable relative to each other by a predetermined amount of play, means securing one of said two parts to said relatively stationary brake member, friction disk means supported on the other of said two parts, means urging said friction disk means against said brake shoe, and return spring means connected at one end thereof to the said other of said two parts.

References Cited in the file of this patent
UNITED STATES PATENTS

| | | |
|---|---|---|
| 2,026,401 | Rockwell | Dec. 31, 1935 |
| 2,421,802 | Mould | June 10, 1947 |
| 2,509,643 | House | May 30, 1950 |

FOREIGN PATENTS

| | | |
|---|---|---|
| 118,425 | Australia | Oct. 14, 1942 |
| 914,198 | France | June 17, 1946 |
| 1,050,353 | France | Sept. 2, 1953 |